United States Patent Office 3,525,935
Patented Aug. 25, 1970

3,525,935
MOISTURE MEASURING SYSTEM AND METHOD FOR MATERIALS HAVING WET AND DRY LAYERS
Boong Y. Cho, Hilliard, Ohio, assignor to Industrial Nucleonics Corporation, a corporation of Ohio
Filed Apr. 22, 1968, Ser. No. 722,939
Int. Cl. G01r 27/26
U.S. Cl. 324—61                  20 Claims

ABSTRACT OF THE DISCLOSURE

A system for measuring the average moisture content of sheet material formed with relatively moist and relatively dry layers includes a pair of A.C. sources, one of relatively high frequency and the other of relatively low frequency. Moisture in the material is determined by measuring the phase shift suffered by current from the high frequency source in being passed through the material, while the thickness of relatively dry layers is determined in response to the amplitude of the low frequency current passed through the material. The high and low frequency responses are combined with a measurement of the material total thickness, as determined from a radiation gauge, to derive an indication of average moisture throughout the total thickness of the material.

---

The present invention relates generally to moisture gauges and, more particularly, to a system for and method of determining average moisture content of a material in response to indications of moisture in a wet layer of the material and the relative thickness of the wet layer to the total thickness of the material.

Most previously developed capacitance probe gauges accurately indicate moisture content only if the moisture is uniformily distributed throughout the material. In measuring the moisture properties of many materials, such as paper during manufacture, there are instances where the assumption of uniform moisture distribution is not sufficiently accurate. In paper processing, a sheet after passing through dryers includes a central moist layer sandwiched between a pair of relatively dry layers. With storage, moisture in the central layer migrates throughout the sheet so that even moisture distribution occurs in the commercially distributed product. Because of the even moisture distribution in the commercially distribted product, the average value of moisture, rather than the wet layer percentage moisture content, is an accurate measure of paper quality.

The prior art recognizes that moisture in paper during manufacture has a tendency to stratify, with the result being that generally utilized techniques produce erroneous indications of average moisture, see U.S. Pat. 3,249,865 to Hanken. The prior art system of the Hanken patent, however, is relatively complex and difficult to use because a plurality of taps on a padded potentiometer function generator must be readjusted each time the gauge is utilized with a different run of analyzed material. It is necessary to readjust the padded potentiometer taps for each material run because the thickness of the wet layer is not computed directly but is assumed to vary in a non-linear manner as a function of the wet layer moisture.

According to the present invention, there is provided a system for and method of measuring average moisture distribution in a material subject to moisture stratification, wherein the thickness of the moisture layer is computed relative to the total thickness of the material so that the need for a complex padded potentiometer function generator is obviated. The relative thickness of the moist layer is determined by ascertaining the total thicknesses of the material and a dry layer or layers. Dry layer thickness is measured by subjecting the material to a relatively low frequency source, i.e., a source having a frequency between 100 and 1,000 hertz, whereby the dry layers comprise virtually all of the material capacitive impedance driven by the low frequency source. The total thickness of the material is measured utilizing standard techniques, such as those employing penetrating radiation. From the measurements of dry layer and total thicknesses the relative thicknesses of the wet and dry layer can be easily determined.

The wet layer moisture content of the material is determined utilizing conventional techniques, such as subjecting the material to a relatively high frequency electric current and measuring the phase shift suffered by the current in passing through the material. The high frequency phase shift technique is preferably utilized for ascertaining wet layer moisture content of the material because the capacitive impedance of the dry layer to the high frequency is negligible in comparison to the resistive impedance of the moist layer.

It is, accordingly, an object of the present invention to provide a new and improved system for and method of determining average moisture content throughout a material.

Another object of the present invention is to provide a system for and method of determining the thicknesses of wet and dry layers in a material being analyzed.

An additional object of the present invention is to provide a new and improved system for and method of determining average moisture content of a material without requiring relatively complex and difficult to adjust function generators.

Still another object of the present invention is to provide a system for measuring average moisture content of a material in response to signals indicative of: material wet layer moisture content; electrical capacity of dry layers in the material; and total material thickness.

A further object of the present invention is to provide an average moisture measuring gauge that is less complex, less expensive and operated in a more facile manner than previously proposed average moisture measuring gauges.

The above and still further objects, features and advantages of the present invention will become apparent upon consideration of the following detailed description of one specific embodiment thereof, especially when taken in conjunction with the accompanying drawings, wherein.

The invention is described specifically in conjunction with a sheet of paper. It is to be understood, however, that the teachings of the invention can be applied to other types of material which are subject to moisture stratification similar to the stratification of paper.

Figure 1:
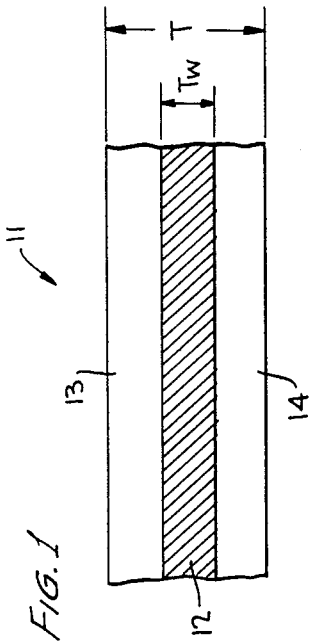
FIG. 1 is a schematic diagram of a cross-sectional view of a typical sheet having wet and dry layers.

Reference is now made to FIG. 1 of the drawings wherein there is illustrated a schematic, cross-sectional view of paper sheet 11, as it appears during manufacture subsequently to being passed through dryers. Sheet 11 comprises inner moist layer 12 sandwiched between a pair of dry outer layers 13 and 14. The moisture in the moist layer is typically 8–12% of the total weight of layer 12, while moisture in each of dry layers 13 and 14 is generally 0–2% of the total weight thereof. For any given type of paper, the moisture in dry layers 13 and 14 can be considered relatively constant, with a value of $q_d$. If the total thickness of sheet 11 is designated as T and the thickness of moist layer 12 as $T_w$, the combined thickness of dry layers 13 and 14 is $T_d = (T - T_w)$.

Figure 2:
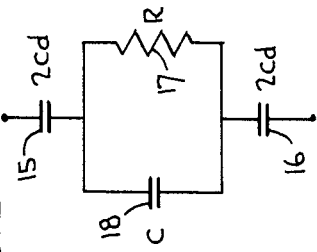
FIG. 2 is a circuit diagram for the equivalent circuit of the sheet of FIG. 1.

Electrically, the properties of sheet 11 are represented by the circuit of FIG. 2 that comprises a pair of series capacitors 15 and 16, each having a value of $2C_d$. In series circuit with capacitors 15 and 16 is the parallel combination of resistor 17 and capacitor 18, respectively having values of R and C. Each of capacitors 15 and 16 has a value commensurate with the capacity of layers 13 and 14, while resistor 17 and capacitor 18 represent corresponding impedance properties of moist layer 12. Because of the dryness of layers 13 and 14 and the exponential relationship between admittance and moisture, the conductive admittance of the dry layers is virtually nil compared to the capacitive admittance thereof and the conductance of moist layer 12. It is noted that by designating the capacities of layers 15 and 16 as $2C_d$, the total capacity of the two dry layers is $C_d$, the dry layer capacitance of sheet 11.

From the equivalent circuit of FIG. 2 for sheet 11, it is determined that the impedances of layers 13 and 14, represented by capacitors 15 and 16, are virtually short circuits to relatively high frequencies, for example, frequencies in the range of 100 kHz. to 530 kHz. Hence, the impedance seen by a high frequency source capacitively coupled across opposite surfaces of sheet 11 consists essentially of resistor 17 in parallel with capacitor 18. To sources of low frequency, in the range of 100 to 1,000 hertz, capacitively coupled across the opposite surfaces of sheet 11, the impedances of capacitors 15 and 16 are much greater than the combined impedances of resistor 17 in parallel with capacitor 18. While the moisture content of layer 12 relative to layers 13 and 14 may differ by a factor of only five or six, the relative impedances of the wet and dry layers differ by a factor on the order of 100 because of the exponential relationship of impedance to moisture. Because of the relative impedances of the wet and dry layers, sheet 11 appears to a low frequency source as a capacitor having a value of $C_d$. Attenuation of a low frequency current applied to sheet 11 is, therefore, a measure of the combined thicknesses of dry layers 13 and 14. In contrast, the phase shift a high frequency current suffers in propagating through sheet 11 is an indication of the moisture in layer 12, as determined by the product $\omega RC$, where $\omega$=the angular frequency of the high frequency source.

According to the present invention, the average moisture of sheet 11 throughout the thickness thereof is determined by ascertaining the wet layer moisture content from an indication of the phase shift caused by the moisture content within layer 12 on a high frequency current. The wet layer moisture content is combined with indications of dry layer moisture, determined from a prior knowledge, and the thickness of layers 13 and 14 which is found by measuring the attenuation of the dry layers on a low frequency current and a sheet thickness gauge. In particular, the average moisture of the total thickness of the sheet 11 can be represented as:

$$q_{ave} = \frac{(q_w)(T_w) + (q_d)(T_d)}{T} \quad (1)$$

where:

$q_{ave}$=average moisture of sheet 11,
$q_w$=the moisture in layer 12, and
$q_d$, $T_d$, T and $T_w$ are indicated supra.

since $T_w = T - T_d$) and $$\frac{T_w}{T} = 1 - \frac{T_d}{T_w}$$

Equation 1 can be rewritten and simplified as:

$$q_{ave} = q_w\left(1 - \frac{T_d}{T}\right) + q_d\left(\frac{T_d}{T}\right) \quad (2)$$

The combined thicknesses of layers 13 and 14, $T_d$, are inversely proportional to the combined series capacitances thereof, $C_d$, and can therefore be represented as:

$$C_d = k/T_d \quad (3)$$

where:

$k$ is a proportionality factor determined by the properties of a capacitance probe applying A.C. fields across sheet 11, and $C_d$ and $T_d$ are given supra.

By substituting Equation 3 into Equation 2, the average moisture across the width of sheet 11 is given by:

$$q_{ave} = q_w\left(1 - \frac{k}{C_d T}\right) + q_d \frac{k}{C_d T} \quad (4)$$

Since the thickness of sheet 11 can be determined readily utilizing well known penetrating radiation gauge techniques, the values of $C_d$ and $q_w$ are ascertainable from capacitance gauge measurements, and $q_d$ is a constant that can be ascertained from prior measurements of the type sheet being examined, the solution of Equation 4 can be obtained in a facile manner.

Figure 3:
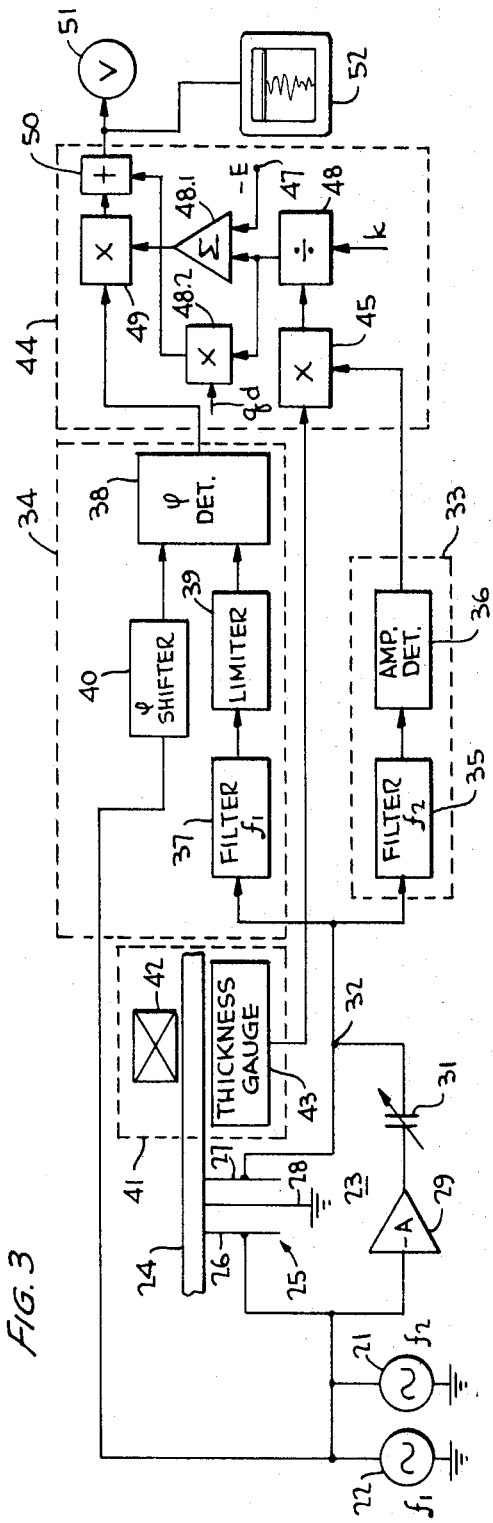
FIG. 3 is a block diagram of an apparatus in accordance with a preferred embodiment of the invention.

An embodiment of the apparatus that can be used for the solution of Equation 4 is illustrated by FIG. 3, wherein low frequency source 21, having a frequency in the range of 100 to 1,000 hertz, is provided. Connected in parallel with source 21 is source 22, having a relatively high frequency in the range of 100 kHz. to 530 kHz. Sources 21 and 22 feed bridge 23 that derives A.C. output signals indicative of the impedance of paper sheet 24.

Bridge 23 includes capacitance probe 25 that comprises electrodes 26 and 27, as well as grounded center electrode 28. As is well known to those skilled in the art, each of electrodes 26–28 is disposed on the same side of sheet 24 and measures the sheet impedance in response to a fringing electric field between plates 26 and 27. Connected in parallel with probe 25 and driven by sources 21 and 22 is inverting amplifier 29, the output of which feeds variable, balancing capacitor 31. The value of capacitor 31 is selected so that under a normalized condition of capacity in the fringing field, typically with only air loading electrodes 26 and 27, the A.C. output voltage magnitude at terminal 32 is zero for the frequencies of both sources 21 and 22.

The insertion of a material other than that utilized for normalizing bridge 23 into the fringing field of gauge 25 unbalances the bridge so that a finite output voltage is derived at terminal 32. If the material is sheet 24, a measurement of the capacitive attenuation properties of layers 13 and 14 to the low frequency signal amplitude, as derived at terminal 32, indicates the combined thickness of layers 13 and 14. In comparison, the phase of the high frequency signal at terminal 32 differs from the phase of the high frequency signal at the output of source 22 by an amount determined by the properties of probe 25 and the moisture in wet layer 12, as indicated by the product $\omega RC$, where $\omega$ equals the angular frequency of source 22. To extract the amplitude and phase information from the low and high frequency signals, the voltage at terminal 32 is applied in parallel to a pair of analyzing networks 33 and 34, which respectively derive signals directly proportional to $T_d$ and $q_w$.

Network 33 includes filter 35, connected to be driven by the voltage at terminal 32 and cascaded with amplitude detector 36. Filter 35 passes the low frequency voltage at terminal 32 to the exclusion of the high frequency voltage, whereby the output voltage of detector 36 is a D.C. signal directly proportional to the capacity of dry layers 13 and 14, i.e., $C_d$, which is proportional to $1/T_d$.

Wet moisture layer analyzing network 34 includes filter 37 for passing the high frequency voltage of source 22 to the exclusion of the low frequency of source 21 and any intermodulation components that may result from nonlinear properties of sheet 24 on the frequencies of sources 21 and 22. The output of filter 37 is fed to one input of phase detector 38 via amplitude limiter 39, whereby changes in the amplitude of the high frequency voltage at terminal 32 do not influence the output of detector 38. The other input of phase detector 38 is a high frequency reference phase derived from source 22 and fed through phase shifter 40, adjusted so that a zero output is derived from detector 38 when the phase shift of the high frequency current in propagating through probe 25 results only from a capacity loading the probe fringing field, i.e., from an impedance having only capacitive reactance and virtually zero conductance being placed in the fringing field.

Moisture gauge normalization prior to its use for measuring the properties of sheet 11 thus involves two separate steps, respectively involving adjustments of capacitor 31 and phase shifter 40 whereby zero amplitudes are derived from detectors 36 and 38. Both adjustments are performed with probe 25 removed from sheet 24, with the capacitor 31 adjustment being accomplished with probe 25 completely unloaded. After capacitor 31 has been set to the proper value, phase shifter 40 is adjusted. Phase shifter 40, however, cannot be adjusted with probe 25 unloaded because the high freqeuncy signal amplitude at terminal 32 is too low to enable proper functioning of detector 38. To enable a sufficiently large amplitude, high frequency signal to be derived at terminal 32 without changing the phase shift of current propagating through probe 25 relative to the phase shift of an unloaded probe, a dielectric plate of glass, for example, is placed on the upper surfaces of electrodes 26-28. The dielectric plate unbalances the bridge sufficiently to enable a relatively large amplitude signal to be derived at terminal 32, but does not change the resistance in the fringing field of probe 25. Therefore, the phases of the high frequency A.C. signals at terminal 32 are the same for both the high and low amplitudes.

Phase detector 38 responds to the reference and variable phase inputs thereof to derive a D.C. output voltage commensurate with the loss angle wet layer 12 imposes on the high frequency signal, indicated by $1/\omega RC$, which is a linear function of $q_w$ within its expected range. Because phase detector 38 is unresponsive to amplitude variations of the high frequency signal coupled to terminal 32, the output thereof is independent of the mass of sheet 24 and indicates only the percentage of moisture in wet layer 12. In contrast, the output voltage of amplitude detector 36 is responsive almost exclusively to the thickness of dry layers 13 and 14, to the exclusion of moisture in sheet 11, and is a function of the thicknesses of layers 13 and 14 in accordance with Equation 3.

The solution of Equation 4 necessitates an indication of total thickness, T, of sheet 24. To derive a signal proportional to T, thickness gauge 41 is provided along sheet 24 in proximity to moisture probe 25. Thickness gauge 41 includes penetrating radiation source 42, typically a beta energy source. Positioned on the opposite side of sheet 24 from source 42 is thickness measuring network 43, that includes a detector responsive to radiation from source 42. Gauge network 43, of the well known type, derives a D.C. signal directly proportional to the thickness of sheet 24, indicated in Equation 4 by T.

The $C_d$, $q_w$ and T signals respectively derived from networks 33, 34 and 41 are combined in computer 44 with a constant voltage indicative of $q_d$ to derive a signal representing the solution of Equation 4 for $q_{ave}$. Computer 44 includes multiplier 45, responsive to the D.C. output voltages of detector 36 and thickness gauge 43, for deriving a D.C. signal proportional to the product $C_dT$. The output voltage of multiplier 45 is fed to a divisor input of division network 48, the numerator input of which is responsive to a D.C. voltage indicative of $k$, a proportionality factor governed by the impedance properties of capacitance probe 25. The D.C. output voltage of division network 48, indicative of the ratio or percentage of dry layer thickness to total sheet thickness, represented by $k/C_dT$, is applied in parallel to separate channels for respectively computing the average wet and dry layer moisture contents.

The average dry layer moisture computing channel includes D.C. multiplier 48.2 responsive to the variable amplitude dry layer thickness percentage indicating output of divider 48 and a D.C. voltage indicative of the dry layer moisture $q_d$. Moisture content in the dry layer can be determined on an a priori basis for a particular type of paper. Thereby, for any particular run of paper the value of $q_d$ is set into computer 44 merely, e.g., by adjusting a slider on a potentiometer. Multiplier 48.2 responds to the predetermined dry layer moisture ($q_d$) input thereof and the variable amplitude dry layer thickness percentage output of divider 48 to derive a signal indicative of the average moisture throughout the sheet due to the contribution of the dry layer moisture, represented by $q_d k/C_d T$.

The average moisture content throughout the sheet due to the contribution of the wet layer is calculated in response to the variable amplitude wet layer moisture output of detector 38 and a signal indicative of the ratio or percentage of the wet layer thickness to the total sheet thickness. The yet layer thickness percentage signal is derived by subtracting the dry layer thickness percentage output signal of divider 48 from a constant voltage indicative of unity. To this end, the output voltage divider 48 is applied as one input to adder 48.1, having another input responsive to the constant negative voltage at terminal 47. The wet layer thickness percentage difference output voltage $$\left(1 - \frac{k}{C_d T}\right)$$

of adder 48.1 is combined with the wet layer moisture content signal derived from detector 38 in multiplier 49 which generates an output signal proportional to the average moisture content in the sheet resulting from the wet layer contribution.

The wet and dry layer average moisture signals respectively derived from multipliers 49 and 48.2 are linearly combined in analog addition network 50, having an output voltage directly proportional to $$q_w\left(1 - \frac{k}{C_d T}\right) + q_d \frac{k}{C_d T}$$

the average moisture throughout the sheet thickness. The average moisture content output of addition network 50 is fed to indicator means comprising D.C. voltmeter 51, connected in parallel with chart recorder 52.

While I have described and illustrated one specific embodiment of my invention, it will be clear that variations in the details of the embodiment specifically illustrated and described may be made without departing from the true spirit and scope of the invention as defined in the appended claims. For example, manual means or a digital computer can be employed to solve Equation 4 once the parameters $q_w$, $C_d$ and T are determined.

I claim:

1. A system for determining the average moisture content of a material having wet and dry layers comprising means applying energy to said material, means responsive to the energy applied to the material for deriving a first signal indicative of the wet layer moisture of the material and for deriving a second signal indicative of the relative thicknesses of said layers, and means combining said first and second signals for deriving an indication of average moisture in the material.

2. The system of claim 1 wherein said energy applying means comprises: a source of oscillations at two different frequencies, and means responsive to the source for capacitively coupling both said frequencies to the material.

3. The system of claim 2 wherein one of said frequencies is sufficiently low that the wet layer impedance of the material to said one frequency is much smaller than the dry layer impedance of the material to said one frequency, and the other of said frequencies is sufficiently high that said wet layer impedance to said other frequency is much greater than said dry layer impedance to said other frequency.

4. The system of claim 3 wherein said first signal is derived in response to the phase shift suffered by current applied to the material from a source of said high frequency energy.

5. The system of claim 4 wherein said second signal is derived in response to the attenuation of current applied to the material from a source of said low frequency energy.

6. The system of claim 5 wherein said energy applying means also includes a source of penetrating radiation for irradiating the material, said second signal being derived in response to irradiation of the material.

7. The system of claim 6 wherein said signal deriving means includes means for combining responses indicative of said attenuation and the amount of radiation absorbed by the material.

8. The system of claim 2 wherein said second signal is derived in response to the attenuation of current applied to the material from a source of said low frequency energy.

9. The system of claim 1 wherein said signal deriving means includes a source of oscillations having a frequency sufficiently low that the wet layer impedance to said frequency is much smaller than the dry layer impedance to said frequency, means capacitively coupling energy from said source to the material, means responsive to the energy capacitively coupled to the material for deriving a first response indicative of the dry layer thickness, second means for applying energy to the material, means responsive to the energy applied to the material by the second means for deriving a second response indicative of the total thickness of the sheet, and means for combining said first and second responses to derive a third response indicative of wet layer thickness.

10. The system of claim 9 wherein said second response deriving means includes a source of penetrating radiation for irradiating the material.

11. The system of claim 9 further including means responsive to the first response and a factor indicative of dry layer moisture content for deriving a fourth response indicative of average moisture in the material due to the dry layer contribution.

12. The system of claim 11 further including means responsive to the third response and said first signal for deriving a fifth response indicative of average moisture in the material due to the wet layer contribution, and means for combining said average indicating responses to derive a signal indicative of average moisture.

13. A system for determining the thickness of a wet layer of a material including wet and dry layers comprising a source of oscillations having a frequency sufficiently low that the wet layer impedance to said frequency is much smaller than the dry layer impedance to said frequency, means for capacitively coupling energy from said source to the material, means responsive to the energy capacitively coupled to the material for deriving a first response indicative of the dry layer thickness, second means for applying energy to the material, means responsive to the energy applied to the material by the second means for deriving a second response indicative of the total thickness of the material, and means for combining said first and second response for deriving an indication of the relative thicknesses of said layers.

14. The system of claim 13 wherein said second means includes a source of penetrating radiation irradiating the material.

15. A method of determining the average moisture content of a material having wet and dry layers comprising the steps of applying energy to said material for deriving a first response indicative of the total moisture of the material in the wet layer and a second response indicative of the relative thicknesses of said layers, and combining said responses together to derive an indication of average moisture in the material.

16. The method of claim 15 wherein said first and second responses are derived in response to capacitively coupling energy of low and high frequencies to the material, wherein one of said frequencies is sufficiently low that the wet layer impedance of the material to said one frequency is much smaller than the dry layer impedance of the material to said one frequency, and the other of said frequencies is sufficiently high that said wet layer impedance to said other frequency is much greater than said dry layer impedance to said other frequency.

17. The method of claim 16 wherein said first response is derived by measuring the phase shift suffered by current from a source of said high frequency energy applied to said material.

18. The method of claim 17 wherein said second response is derived by measuring the attenuation by the material to current from a source of the low frequency energy coupled to the material.

19. The method of claim 17 wherein said second response is derived by measuring total material thickness by applying energy to the material, and combining said total thickness indication with an indication of said attenuation.

20. A method of determining the thickness of a wet layer of a material including wet and dry layers comprising capacitively coupling oscillations to the material, said oscillations having a frequency sufficiently low that the wet layer impedance to said frequency is much smaller than the dry layer impedance to said frequency, measuring the attenuation by said material of current from a source of the oscillations to derive a first response indicative of the dry layer thickness, applying energy to the material, in response to the applied energy deriving a second response indicative of the total thickness of the material, and combining said responses to indicate the wet layer thickness.

References Cited

UNITED STATES PATENTS

| | | | |
|---|---|---|---|
| 2,937,280 | 5/1960 | Gilman | 250—83.3 |
| 2,948,850 | 8/1960 | Ederer | 324—61 |
| 3,143,886 | 8/1964 | Lippke | 324—61 X |
| 3,155,900 | 11/1964 | Hanken | 324—61 |
| 3,249,865 | 5/1966 | Hanken | 324—57 X |

EDWARD E. KUBASIEWICZ, Primary Examiner